Patented Sept. 24, 1935

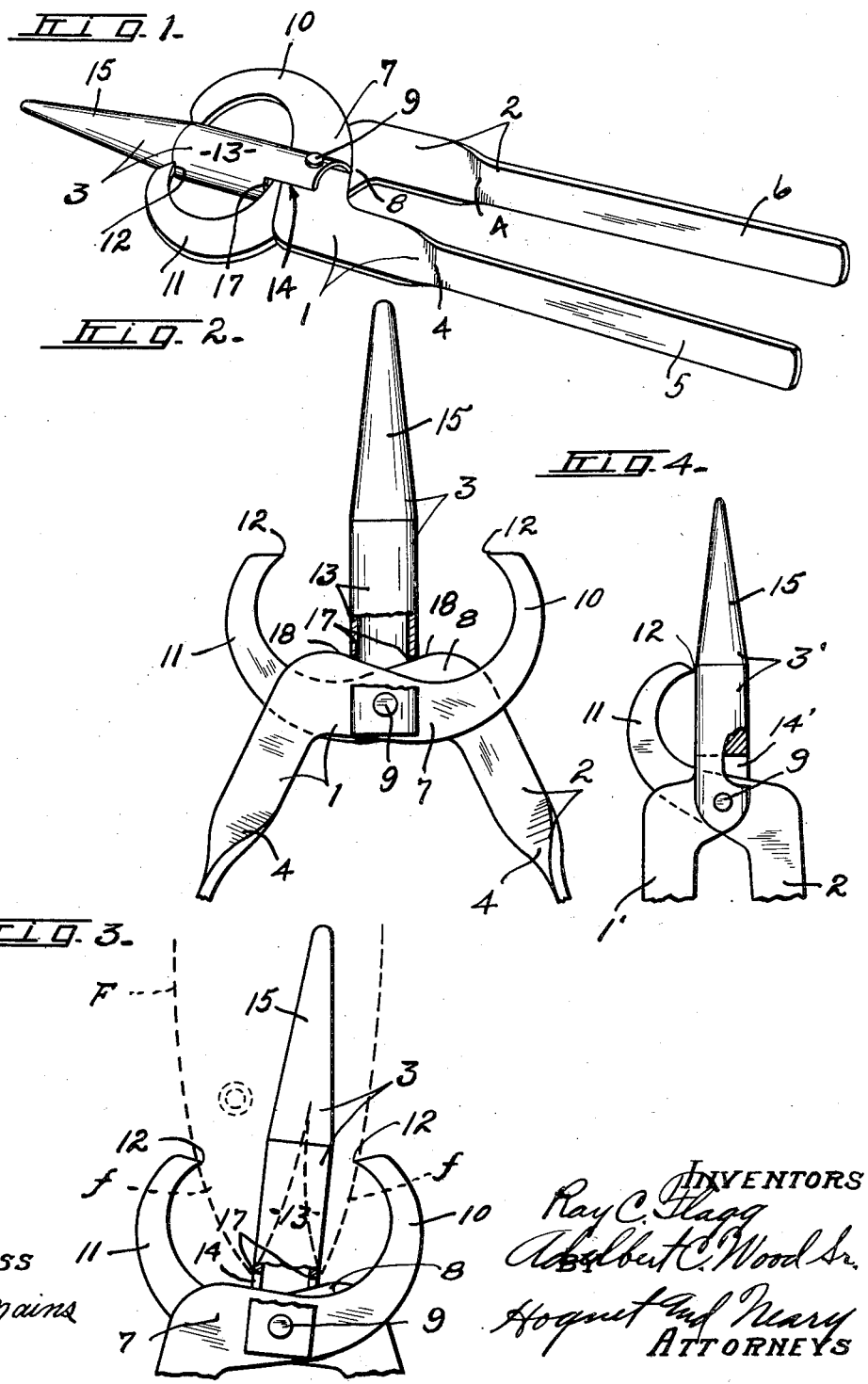

2,015,262

UNITED STATES PATENT OFFICE 2,015,262

FISH-HOLDING IMPLEMENT

Ray C. Flagg and Adelbert C. Wood, Sr.,
Brewerton, N. Y.

Application June 28, 1934, Serial No. 732,809

6 Claims. (Cl. 17—8)

This invention relates to a fish holding implement that is particularly adapted to be used in handling the body of a fish when removing the scales, fins and entrails thereof.

The main object of the invention is to provide means for firmly gripping and supporting the body of a fish while scaling and cleaning the fish. In carrying out the above-mentioned object, we have provided a clamping means comprising an elongated member adapted to be inserted in the mouth and throat of a fish and pivoted means adapted to engage the outer portion of the head and to co-operate with the inserted member to firmly grip the head therebetween for maintaining the forward portion of the body of the fish in a more or less fixed or rigid position during the cleaning of the fish.

More specifically our invention comprises in its preferred form a pair of clamping jaw members movable toward and from each other for engaging the outer surface of the head and a third clamping member comprising a prong or spindle pivotally associated with the jaw members to extend between and some distance beyond said jaw members and adapted to be thrust into the mouth and throat of a fish.

Another object of the invention is to provide an implement of the above-mentioned class with means whereby when the jaw members are in the fully opened position, the stem or prong will be automatically secured against pivotal movement in a position intermediate the jaw members so that the stem and jaws may be quickly and easily brought into holding engagement with the fish.

Other objects and advantages pertaining to the structure of the device and to the form and relation of the parts thereof will more fully appear from the following description, taken in connection with the accompanying drawing, in which:

Figure 1 is a perspective view of a fish holding implement embodying the various features of the invention;

Figure 2 is a plan view of the device illustrated in Figure 1 with the jaws shown in the opened position, the outer ends of the handles being broken away and the spindle having a portion thereof shown in section;

Figure 3 is a plan view of our novel implement similar to that shown in Figure 2 illustrating the same in a partially closed position as when operatively engaging a fish for holding the same and illustrating the head or forward portion of the body of the fish by broken lines; and Figure 4 is a plan view having portions broken away of a modified form of our invention.

As illustrated more particularly in Figures 1, 2 and 3 of the drawing, the device consists of a pair of elongated substantially rectangular clamping levers 1 and 2, and a co-operating clamping member 3, all of which are preferably formed of steel, plated or otherwise treated to render the same non-corrosive or rust proof. The levers 1 and 2 as shown in Figure 1 are twisted as at 4 intermediate the ends thereof to form handle portions 5 and 6 and fulcrum portions 7 and 8 respectively. The levers are arranged with the fulcrum portions 7 and 8 extending in opposite directions in overlying relation with each other and are pivotally secured together with a pin 9.

The ends of the levers opposite the handles 5 and 6 are curved in opposite directions to form opposed pincher jaws 10 and 11 respectively. Each of the jaws is preferably provided with a relatively sharp tooth or gripping edge 12 at the inner end thereof adapted to engage respective sides of the mouth of the fish for bringing the same into gripping relation with the clamping member 3.

The clamping member 3 in this instance is a tubular member of spindle or prong formation having a cylindrical body portion 13 provided with a diametrically disposed slot 14 at the inner end thereof adapted to receive the fulcrum portions 7 and 8 of the levers 1 and 2 therein. The stem is pivotally secured to the levers 1 and 2 by the pivotal pin 9 and extends outwardly therefrom between the jaws 10 and 11. The body portion 13 of the stem or prong preferably extends a sufficient distance outwardly from the pivot 9 to co-operate with the gripping edges 12 of the jaw members to clamp the upper and lower portions of the mouth of the fish therebetween. The outer end of the prong is tapered to form a conical portion 15 which extends some distance beyond the body portion 13 so as to extend beyond the mouth of the fish and some distance into the throat thereof when the implement is being used for supporting and maintaining the forward portion of the body of the fish in a more or less non-flexible rigid condition.

The length of the slot 14 in the clamping member 3 is sufficient to permit the gripping edges 12 of the clamping levers 1 and 2 to be freely moved into and out of engagement with said member during the opening and closing of the jaws. At the same time, the length of the slot 14 is such that the inner end thereof forms abutting shoulders 17 adapted to be engaged by the forward edge 18 of the fulcrum portions 7 and 8 of the levers 1 and 2 when the jaws are in the fully opened position, as shown in Figure 2. In this instance, the shoulders 17 at opposite sides of the prong 3 are spaced equal distances from the pivot 9 so that when the levers are in the fully opened position, the prong 3 will be positioned and firmly maintained by the fulcrum portion of the levers substantially midway between the contact or gripping edge 12 of the jaws. It will, therefore, be seen that when the jaws are moved to the open position for engaging the mouth of the fish, the prong 3 will be maintained in fixed relation with the jaws whereby said prong may be guided by the handles 5 and 6 when inserting the prong into the mouth and throat of the fish as F, Figure 3.

Further, it will be observed that, inasmuch as the upper and lower jaws as f and f' respectively of a fish are usually of different thicknesses, when the clamping jaws 10 and 11 are moved about the pivot 9 into engagement with the head of the fish, the prong 3 is free to pivot about the pin 9 as an axis and assume any position intermediate the gripping edges 12 as determined by the mouth of the fish so that the tapered portion 15 of the prong may easily engage the throat of the fish and at the same time the jaws of the fish will be clamped to the body portion of the prong at opposite sides thereof with uniform or equal pressure by the gripping edges 12 of the levers 1 and 2.

The device shown in Figure 4 is similar to the one shown in Figures 1, 2 and 3 with the exception that one of the levers as 1' instead of having the jaw as 10 associated therewith is rigidly secured to or made integral with the clamping member or prong 3' so that the prong 3' and jaw 11 may be positively moved into and out of clamping relation with each other by the manipulation of the handles as 5 and 6 of the implement. When using the device shown in Figure 4 it is obvious that the prong 3' may be inserted into the mouth and throat of the fish for engaging the same in the same manner in which the prong 3 is operated, while only one jaw of the fish will be clamped to the member 3' by the jaw 11.

The spindle 3' may be a tubular member such as that disclosed in Figures 1, 2 and 3 or this prong may be composed of a solid piece of material as indicated having a diametrically disposed slot 14' in one end thereof adapted to receive the lever 2 therein and to permit the free rocking movement of the lever from the open to the closed position. The lever 2 may be pivotally secured to the prong 3' and lever 1' by the pin 9, as illustrated.

While we have shown and particularly described the preferred embodiments of our invention, we do not wish to be limited to the exact construction shown as various changes in the size, form and relation of the parts thereof may readily be made without departing from the spirit of the invention as set forth in the appended claims.

We claim:

1. An implement for holding a fish comprising a pair of clamping members movable toward and from each other, each of said members being provided with a gripping edge and a third clamping member pivotally associated with the first-mentioned clamping members to extend between and some distance beyond said gripping edges, and means associated with said clamping members adapted when the gripping edges are in the open position to maintain the third member against pivotal movement relative to said gripping edges.

2. An implement for holding a fish comprising pivotally connected clamping levers having suitable handles and gripping edges and a prong pivotally connected with the levers to extend outwardly between and some distance beyond said gripping edges, said levers and prong having coacting means adapted when the clamping edges are in the open position to maintain said prong against pivotal movement intermediate said edges.

3. An implement for holding a fish comprising a pair of clamping levers having suitable handles and gripping edges, a pin pivotally connecting said levers to each other intermediate the ends thereof, a prong pivotally mounted on said pin to extend outwardly between and some distance beyond said gripping edges, said levers and prong having coacting means adapted when the gripping edges are in the open position to maintain said prong against pivotal movement intermediate said edges.

4. An implement for holding a fish comprising pivotally connected clamping levers having suitable handle and gripping surfaces, a prong pivotally connected with the levers to extend between said levers in cooperative clamping relation with said gripping surfaces, and means associated with the levers and prong for moving said prong to a position substantially mid-way between the gripping surfaces when said gripping surfaces are in the open position.

5. An implement for holding a fish comprising a pair of levers, each of said levers having one end portion provided with a handle and the other end thereof formed with a gripping surface, a pin pivotally connecting said levers to each other whereby the gripping surfaces may be moved relatively to each other toward and from the open position and a prong pivotally mounted on said pin to extend outwardly therefrom between the gripping surfaces in cooperative relation therewith and for swinging movement intermediate said gripping surfaces.

6. An implement for holding a fish comprising a pair of levers, each of said levers having one end portion provided with a handle and the other end thereof formed with a gripping surface, a pin pivotally connecting said levers to each other whereby the gripping surfaces may be moved relatively to each other toward and from the open position, a prong pivotally mounted on said pin to extend outwardly therefrom between the gripping surfaces in cooperative relation therewith and for swinging movement intermediate said gripping surfaces, and co-acting means associated with the levers and prong for moving said prong to a position substantially mid-way between the gripping surfaces when said gripping surfaces are in the open position.

RAY C. FLAGG.
ADELBERT C. WOOD, Sr.